United States Patent
Woodell

(10) Patent No.: US 6,741,203 B1
(45) Date of Patent: May 25, 2004

(54) ADAPTIVE RADAR THRESHOLDS SYSTEM AND METHOD

(75) Inventor: Daniel L. Woodell, Robins, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 10/281,581

(22) Filed: Oct. 28, 2002

(51) Int. Cl.⁷ .............................................. G01S 13/95
(52) U.S. Cl. .......................... 342/26; 342/85; 342/92; 342/120; 342/205
(58) Field of Search .......................... 342/26, 73, 82, 342/83, 85, 88, 89, 91, 92, 93, 120, 122, 174, 205

(56) References Cited

U.S. PATENT DOCUMENTS

| | | | | |
|---|---|---|---|---|
| 3,665,467 A | * | 5/1972 | Haroules et al. | 342/351 |
| 4,253,335 A | * | 3/1981 | Shimomura | 73/384 |
| 4,873,481 A | * | 10/1989 | Nelson et al. | 324/640 |
| 5,293,325 A | * | 3/1994 | Roos | 702/89 |
| 5,488,375 A | * | 1/1996 | Michie | 342/26 |
| 5,544,525 A | * | 8/1996 | Peterman et al. | 73/170.13 |
| 5,905,459 A | * | 5/1999 | Bunch | 342/92 |
| 6,201,494 B1 | * | 3/2001 | Kronfeld | 342/26 |
| 6,549,161 B1 | * | 4/2003 | Woodell | 342/26 |

OTHER PUBLICATIONS

"Calibration of an airborne multiparameter precipitation radar with an active radar calibrator",Hanado, H.;Kumagai, H.;Iguchi, T. Kozu, T.; Nakamura, K.; Horie, H.;IGARSS '96. 'Remote Sensing for a Sustainable Future.',May 27–31 1996 Ps: 512–514 vol. 1.*

"Attenuation and space diversity statistics calculated from radar reflectivity data of rain",Goldhirsh, J.; Robison, F.; Antennas an Propagation, IEEE Transactions on [legacy, pre–1988], vol. 23Issue: 2, Mar. 1975 Page(s): 221–227.*

"Initial results from a volume scanning three wavelength polarization lidar",O'Brien, M.D.; Evanisko, G.R.; Philbrick, C.R.;Combined Optical–Microwave Earth and Atmosphere Sensing, 1995. Conf Procs., Second Topical Symposium on , Apr. 3–6, 1995 Ps: 135–137.*

"New adaptive algorithm for radar turbulence detection in clouds and precipitation", Yanovsky, F.; Prokopenko, I.; Ligthart, L.;Geoscience and Remote Sensing Symposium, 2000. Proceedings. IEEE2000 Int'l, vol.: 7 , Jul. 24–28, 2000 Ps: 3145–3147.*

* cited by examiner

*Primary Examiner*—John B. Sotomayor
(74) *Attorney, Agent, or Firm*—Nathan O. Jensen; Kyle Eppele

(57) ABSTRACT

A system and method for adapting weather radar gain is disclosed. The system and method includes estimating a freezing altitude. The system and method also includes determining, based on the freezing-altitude estimate, the altitude of more than one atmospheric layer. The system and method further includes determining the proportion of a radar beam sample in each atmospheric layer and adjusting the radar gain, based on the proportion.

18 Claims, 2 Drawing Sheets

ND METHOD

BACKGROUND

Conventionally, pilots use weather radars to detect and then avoid hazardous weather. Conventional radar systems may produce the desired results only in a limited environment. Typically, airborne threshold systems are traceable to ground-based weather radar thresholds for wet precipitation generated from convective weather. Aircraft flying substantially above ground and at altitudes far above the normal altitudes for wet precipitation, find that the ground referenced thresholds detect too little weather and the weather that is detected is presented at too low of athreat level. In regions of weather where icy precipitation is melting, these systems may over detect and over warn of weather threats. To better detect and warn during cruise altitude situations many airborne radar systems modified their radar thresholds to produce more detections and greater threat levels at altitude. While making radar performance more acceptable at altitudes, this threshold change over warns and over detects at low altitudes, especially in weather situations where frozen precipitation is melting.

Conventionally, the problem of low sensitivity at cruise altitudes while tending to be overly sensitive at low altitudes has lead to three solutions currently in service today:

1. Set thresholds for one environment only and take what you get in the other environments. This is the "one size fits all" solution. Thresholds are typically set as a compromise between high altitude and low altitude performance.
2. Provide a manual gain/threshold control to allow the operator to set the weather representation to match their expectations. Very good performance can be had with this solution but operator training and workload are a problem.
3. Automatically increase sensitivity as aircraft altitude increases. This system can be made to work better than the single threshold solution but still fails to produce robust radar detection in various environments with different weather situations. Typically these systems reduce their sensitivity at long ranges as a function of antenna tilt to keep from over-warning as the radar beam impinges on possible low altitude wet precipitation and on the ground.

Although aircrews desire to use the weather radar as a hazard detector, the radar does not make direct estimates of hazard. Instead, the radar remotely estimates the reflectvity of precipitation in a sampled volume of the atmosphere. A simple model of reflectivity verses precipitation rate can then be used to estimate the rate of precipitation in that atmospheric volume. Historically, high precipitation rates and high radar reflectivity estimates have been associated with two different hazards produced by convective weather; hail and turbulence. Radar systems are calibrated to produce a green display when any precipitation is detected, a yellow display where reflectivity is high enough to produce some chance of a hazard, and a red display when weather produces reflectivity estimates high enough to infer a weather hazard is very likely. The likelihood of weather hazards is based on statistics generated over the North American continent in the spring and summer from radar estimates reflectivities taken from ground based radars. Airborne weathers radars that are used at other altitudes and geographies from where the hazard model data was captured, will generally not capture the threat statistics desired by the aircrew.

Accordingly, there is a need for a system and method to adapt radar thresholds to work in a wider range of environments. Further, there is a need for a system and method that automatically adapts radar thresholds as a function of weather sample altitude, temperature, geography, time of year and it would be desirable to provide a system and/or method that provides one or more of these or other advantageous features. Other features and advantages will be made apparent from the present specification. The teachings disclosed extend to those embodiments which fall within the scope of the appended claim, regardless of whether they accomplish one or more of the above-mentioned needs.

SUMMARY

An example of the invention relates to a method for adapting weather radar gain. The method includes estimating a freezing altitude. The method also includes determining, based on the freezing altitude estimate, the altitude of more than one atmospheric layer. The method further includes determining the proportion of a radar beam sample in each atmospheric layer and adjusting the radar gain, based on the proportion.

Another example of the invention relates to an airborne weather radar system. The system includes a radar antenna on board an aircraft and an adjustable gain circuit for the electromagnetic signal sent via the radar antenna. The adjustable gain circuit is coupled to the radar antenna. The adjustable gain is adjusted based on weather sample altitude and temperature.

Yet another example of the invention relates to a method of adapting radar gains for a weather radar. The method includes measuring a temperature, measuring an altitude, and computing a radar gain based on the temperature and altitude.

Alternative exemplary embodiments relate to other features and combination of features as may be generally recited in the claims.

BRIEF DESCRIPTION OF THE DRAWINGS

The invention will become more fully understood from the following description, taken in conjunction with the accompanying drawings, wherein like reference numerals refer to like elements, in which.

DETAILED DESCRIPTION OF PREFERRED AND EXEMPLARY EMBODIMENTS

Figure 1:
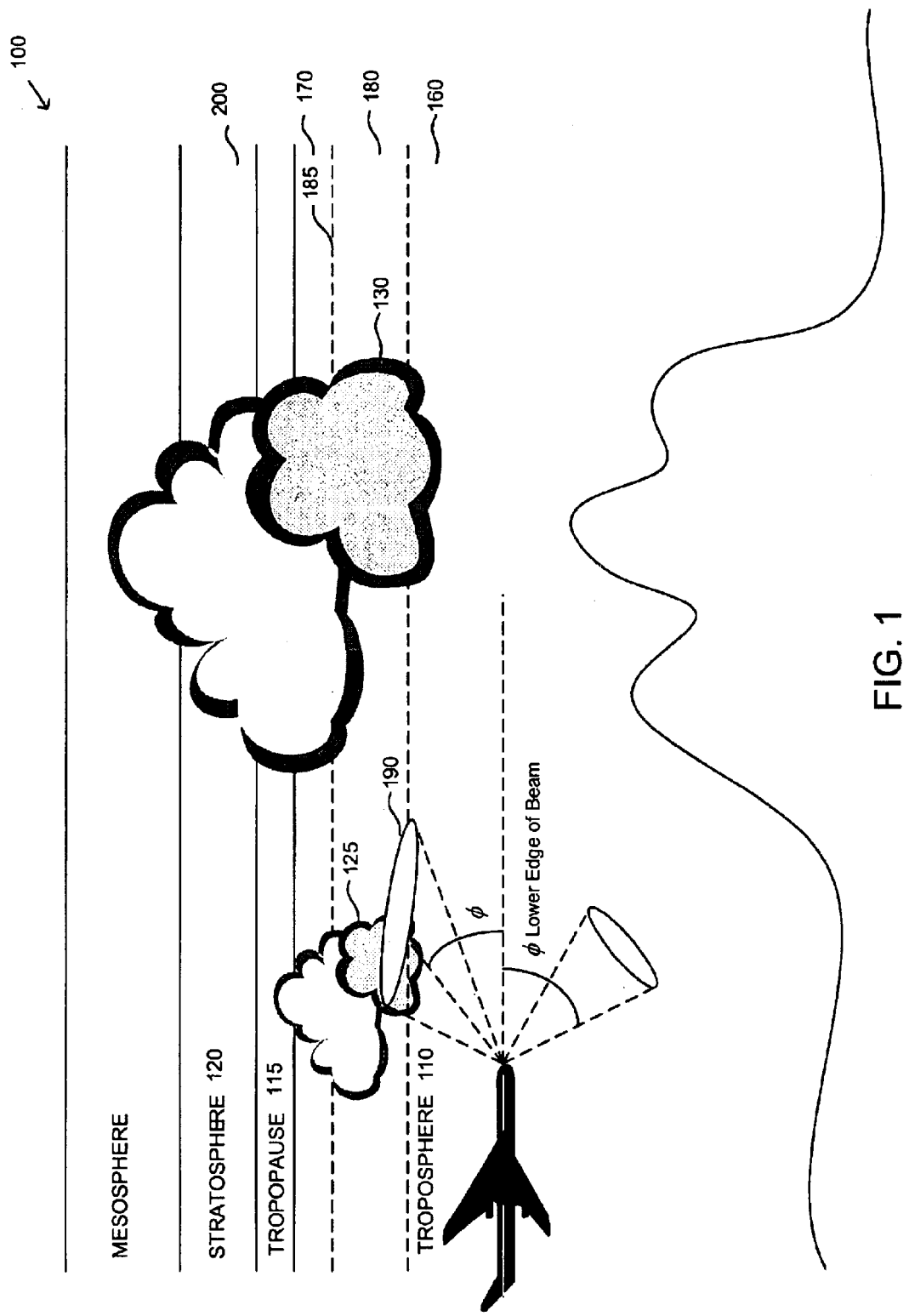
FIG. 1 is an exemplary diagram of an airplane having a weather radar system and flying in the atmosphere.
Figure 2:
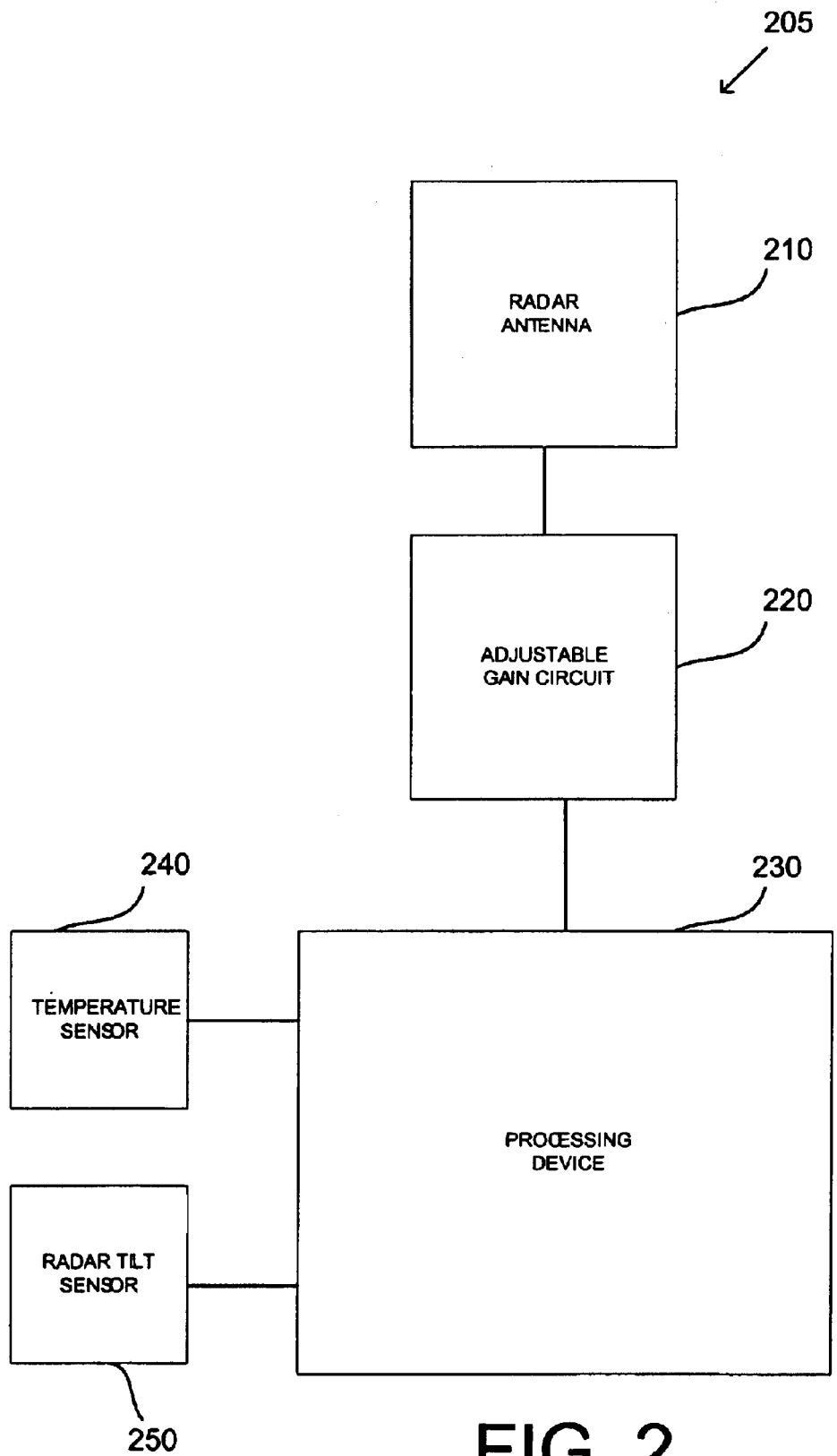
FIG. 2 is an exemplary block diagram of a system having an adjustable gain circuit.

Referring first to FIG. 2, a radar system 205 includes a radar antenna 210 for sending and receiving radar signals. System 205 also includes an adjustable gain circuit 220 that is configured to change the gain of the radar signal provided to radar antenna 210. Processing device 230 receives temperature data from temperature sensor 240 and radar tilt sensor 250. In an exemplary embodiment, processing device 230 is configured with instructions which calculate and/or determine an appropriate adjustable gain command which is to be communicated to adjustable gain circuit 220 based on data supplied to processing circuit 230, such as but not limited to radar beam direction, temperature, latitude and/or location, time of day, time of year, altitude, etc.

To generalize the relationship between aviation hazards and reflectivity, some characteristics of the atmosphere 100 and convective weather must be understood. In the operational altitudes of aircraft, air temperatures generally decrease with increasing altitudes. At some high altitude, temperature increases with increasing altitude for a short range of altitudes. This inversion of the normal temperature verses altitude curve marks the separation between the troposphere 110 and the stratosphere 120 (tropopause 115). Most weather that represents a hazard is contained in troposphere 110. Convective weather (illustrated as cloud 125) begins at approximately the altitude when freezing occurs. Convection grows the weather cell upward while precipitation grows the weather cell down toward the ground. Convective cells that are more energetic (represented as cloud 130) grow to higher altitudes. Thus, the highest cell tops generally correspond to the convective weather that represents the most aviation hazard. Some cells may have enough energy to punch through tropopause 115 and overshoot this stable airmass boundary. In all cases, convective cells grow with updrafts of low altitude moist air and take high altitude air down to the surface in a downdraft. The updrafts contained in high energy cells are responsible for hail and the boundaries between updrafts, downdrafts, the environmental airmass are responsible for much of the turbulence encountered by aircraft.

Thus, the convective cell can be divided into four different altitude parts: a wet low altitude component 160, a melting band 180, a frozen altitude 170, and altitudes 200 at and above tropopause 115. At low altitudes, once the state change of frozen to liquid occurs, the reflectivity at wet altitudes does not vary. During the state change in the melting band, reflectivity grows due to the long icy structures being covered with liquid water. This may be seen on a radar display as a "bright-band" effect. Higher than normal reflectivity may be altitudes observed at which hydrometeors are frozen, and reflectivity tends to decrease at about 6.5 dB/kilometer of altitude above a freezing altitude 185. At altitudes above tropopause 115, any weather return from convective weather originating below tropopause 115 must be considered to be the result of a very energetic convective cell and considered hazardous.

Each estimate of reflectivity produced by the radar is taken from a given antenna position and range. Knowing the size of the antenna beam at that range, the amount of the radar sample volume within each of the four possible regions of the atmosphere may be computed. For a radar sample wholly contained in the wet region, little or no modification of the thresholds relating radar estimated reflectivity with hazard level is required. For those portions of the radar beam involved in the melting bright-band region, a reduction in sensitivity of about 7 dB may be used. Portions of the sample volume originating above the freezing altitude will tend to drop off at some rate, such as the 6.5 dB/kilometer. Accordingly, estimations from this region should be inflated by about that 6.5 dB/kilometer height above the freezing altitude. For detections above the tropopause 115, a substantial sensitivity increase is suggested. With a substantial increase in sensitivity, then very low level detections should be inflated into a hazard.

The separation of the atmosphere into four layers is driven by the 0 degree C. altitude, an open loop approximation of 300 meters thickness for the melting band, and the height of tropopause 115. Since little weather detection takes place in stratosphere 120, this region may be deleted in one embodiment of adaptive threshold operation although there will be some loss in generality. In other embodiments, stratosphere 120 may be retained. The zero degree altitude may be estimated by using the aircraft outside air temperature and the known aircraft altitude along with a lapse rate assumption to produce an estimate of the freezing altitude. Lapse rate is the average temperature change for a given change in altitude. Either an adiabatic lapse rate or a saturated lapse rate could be used in this estimation process depending on whether clouds are or are not in between the aircraft's altitude and the estimated freezing altitude 185.

Additionally, threshold adaption may take place based on latitude, time of year, time of day, or other parameters. Convective cells reaching tropopause 115 may be considered very energetic. The typical tropopause height in the region from the equator to about 30 degrees latitude is about 17 kilometers (55.7-kfeet) but the height at the poles is only about 9 kilometers (29.5-kfeet). Tropopause height between 30 degrees and the poles can be roughly linearly interpolated from 9 kilometers at 90 degrees and 17 kilometers at 30 degrees. Thus the 6.5 dB/kilometer over freezing altitude constant can be modified to produce more threshold change per unit altitude at the poles. Experience dictates convective cells in Alaska of 7-kilometer height being as severe as cells at mid latitudes in North America of 14-kilometer range. On the equator, weather in the 14 kilometer height range may be benign stratiform rain and not even convective in nature. Therefore, the 6.5 dB/kilometer could be modified as a function of latitude. Note in locations considered, surface temperatures and the zero degree altitude vary substantially. Some of the required threshold changes will be driven by those changes in the zero degree altitude.

The freezing altitude 185 may be estimated and gain changes may be driven from the amount of each sample's involvement in each modeled atmospheric layer. Thus, an exemplary system compensates as the radar beam is pointed up as well as down. Conventional systems do not compensate in both lookup and look down cases and are driven by aircraft altitude not sample altitude. Gain in the proposed system may be decreased as well as increased. Decreases happen when samples are substantially involved with returns from the bright-band. Conventional systems are not driven by hydrometeor state and do not have knowledge of or compensate for bright-band samples. Conventional systems do not use latitude information to adapt thresholds. Conventional systems generally modify receiver gain or back of the radar thresholds to build a compensation system. An exemplary system uses a high gain system in which gain is only reduced as the receiver approaches saturation.

The fixed thresholds traditionally used to encode weather radar data may be optimized for low altitude wet precipitation. The thresholds are set to produce a yellow display when a moderate chance of a hazard to aviation is present, a red display when an aviation hazard is likely, a green display from precipitation where little or no hazard is present, and a black display when nothing is detected. The statistics used to generate the threat assessment may be based on low altitude data. Higher altitudes and lower temperatures bring a change in threshold requirements. The radar reflectivity of precipitation may be broken into 3 bands; a wet low altitude band 160, a melting band 180 just below freezing altitude 185 in the atmosphere, and an icy band 170 above the melting band where temperature continues to decrease as altitudes are increased until tropopause 115 is reached. A fourth band 200 can be added if needed, for altitudes above the tropopause.

Radar reflectivity drops when the hydrometeors being illuminated have changed from a wet to a frozen state. In addition, frozen hydrometeors (hail, graupel, and snow), falling from regions with temperatures below freezing to regions with above freezing temperatures, can produce very large radar returns due to partial melting of icy structures. Partial melting produces liquid covered icy particles which have large major axis dimensions., Because the radar generates returns from Rayleigh scattering, these long liquid covered structures have very large radar cross-sections. This region's large cross-section hydrometeors produce a constant altitude "bright band" on a conventional radar display. Thus, this melting produces a region where thresholds may have to be tailored to not over-warn.

This set of threshold requirements have been met in the past by producing thresholds that were over sensitive at low altitudes and under sensitive at high altitudes. This single threshold setting was not optimized for any real aircraft situation but was a compromise, a "one-size" fits all, trying to work over the entire needs space. This single threshold also contributes to the reported "red out" problem. A working hypothesis for red out is that red out is generated in stratiform rain when strong radar returns are generated by the melting "bright band". Red out is not generally reported in convective situations. Convective weather with if s substantial vertical mixing disrupts the bright band signature and most aircraft avoid convection at all possible times. So even if some regions of convective weather produce returns which have been augmented by melting precipitation to produce a red radar display, the red returns match the pilots perception and the radar display is considered accurate. Stratiform weather on the other hand has low turbulence energy and generally low precipitation rates. So pilots flying in regions of bright band augmented radar returns generally report the radar as producing a display which is much too hot while almost nothing was seen on the windscreen.

Knowing the problems with conventional systems, the problem becomes one of how to tailor the thresholds for each sample environment. What is important is the radar characteristics of the region in space sampled by the radar beam at a particular radar range. The aircraft's height is important, but platform height is only one parameter in determining each radar's sample location in the atmosphere. Antenna vertical elevation is also important as is the range to the sample. Once the location of the sample has been determined, the samples relationship to the modeled weather may be determined.

For weather radar purposes, weather can generally be modeled in three layers previously described; the wet moderate reflectivity layer 160, the low reflectivity frozen layer 170, and the very high reflectivity melting layer 180. The primary data needed to begin this layer modeling is the altitude 185 at which freezing temperature is reached. This altitude can be estimated in several ways; a simple constant guess, a guess based on lat/long/time of year/time of day, a guess based on a single known temperature at a known altitude which is modified by estimated lapse rate, external data sources of temperatures aloft, or a direct measurement of temperatures aloft. Lapse rate is the average temperature change as altitude is increased. Typical dry air lapse (or dry adiabatic) is 5 degrees Celsius per thousand feet of altitude change while the lapse rate in clouds is about 2 degrees. The lapse rate in clouds where the relative humidity is 100% is called the saturated lapse rate. With the current outside air temperature and having an estimate of lapse rate, the freezing altitude can be readily estimated. Some situations may require a different lapse rate assumption such as the dry adiabatic lapse rate.

Once the freezing altitude 185 is estimated, the location of the low reflectivity region 170 can be assumed to be above that altitude. At and below the freezing band is the bright band 180. Radar literature and practice estimates this band as 100 to 300 meters thick. Below the bright band is the moderate reflectivity wet region 160. The reflectivity of the wet region is about 7–10 dB higher than the frozen region's reflectivity. The bright band's 180 reflectivity is usually estimated to be higher than the underlying wet region 160 by 5–10 dB.

Knowing the radar sample's 190 location verses the current atmospheric model and the difference in radar reflectivity between weather layers is necessary, but not sufficient to allow compensation for hydrometeor state to be performed. The missing ingredient is the volumetric extent of each radar sample and the possibility that different portions of the sampled volume may lay in different weather layers. Consider a 3 degree beam width antenna. The beam sample volume at 40 nautical miles range will be about 12,000 feet across. In this situation, even a 1000 foot thick bright band may only be sampled by $1/10$ of the radar sample volume. So in this example, bright band whose peak reflectivity is 7 dB higher than the wet under lying region will not significantly change the radar return power to the radar on which radar reflectivity estimate is based. On the other hand, consider the same bright band at 5 nautical miles. Now beam diameter is about 1,500 feet. A radar sample positioned in the bright band from this range would have its returns dominated by bright band reflections.

In addition to knowing about the radar beam's involvement with each of the three weather layers defined so far, beam involvement with the ground should also be known. Consider the cases of cold weather where surfaces temperatures are well below freezing and warm weather when surface temperatures are above freezing. Ground returns will be sampled and their Z levels estimated with the two different gains. Thus, ground targets would vary in their radar displays depending on temperature. Since this is not desirable, elevated adaptive gains should end before the radar beam is substantially involved with the ground.

Inferred knowledge of freezing altitude may be tempered with the fact that the freezing altitude may vary, the process of estimating the freezing altitude may be in error due to a poor choice of lapse rate, and some weather situations have substantial vertical mixing which produce "out of place" hydrometeors. So although one may be tempted to regard hydrometeor state induced reflectivity changes as absolute, possible errors make the best possible course of action slow increases and decreases in gain where gain is restricted in the region of a potential bright band A fourth region 200, above the tropopause, could be added even though it would not be in response to hydrometeor state. Convective weather which is energetic enough to produce "overshooting tops" above the tropopause, is energetic enough for all aircraft to want to avoid. Adding 20 dB to these would allow Z2 level responses to produce avoidance directing Z4 or red radar display responses.

This system differs from conventional systems in that gain increases are tied to state changes of hydrometeors as opposed to an open loop/best guess control law. Freezing altitude is estimated and gain changes are driven from the amount of each samples involvement in each modeled atmospheric layer. The system actively compensates as the radar beam is pointed up as well as down. Conventional systems do not compensate in both lookup and look down cases. Gain may be decreased as well as increased. Gain decreases happen when samples are substantially involved with returns from the bright-band 180. Conventional systems that are not driven by hydrometeor state, do not have knowledge of or compensate for bright-band samples. Conventional systems generally modify receiver gain or back off the radar thresholds to build a compensation system.

EXEMPLARY ADAPTIVE GAIN SYSTEM

Weather model compensation may be accomplished by solving loss equations. Losses could be used to directly drive gains or thresholds as needed. An exemplary adaptive gain system may be somewhat simplified in nature. Only two regions are defined; the region above freezing altitude 185 and the regions at or below freezing altitude 185. Samples taken from below the freezing altitude are taken and encoded assuming calibrated thresholds and gains. Samples above the freezing band are processed to produce higher level return estimates. Since tolerance in the estimation of freezing altitude could lead to higher estimated return levels when sampling the bright-band 180, the freezing altitude 185 used in the adaptive threshold process is lifted by 1000 feet to provide some tolerance against adding insult to injury in the sampling of the bright band. Thresholds/gain may be moved a maximum of 10 dB to increase the estimated return level. While more change could be added at altitude if all high altitude weather was considered hazardous, 10 dB of gain change more than covers the typical hydrometeor state change from frozen to wet. Abrupt transitions in gain are avoided by slewing increases in over large altitudes and ranges. This will tend to preserve the weather picture of convective activity when a strong line of demarcation between high reflectivity wet regions and low reflectivity frozen regions are not seen to do substantial vertical mixing. Gain/threshold at minimum range is a function of the aircraft's height over the tolerance elevated estimated freezing altitude. Gain at minimum range is increased at a rate of 10 dB per 15,000 feet. Minimum range gain below the estimated freezing altitude is set at 0 dB. As sample height increases, gain increases at the rate of 10 dB per 15,000 feet. When the beam is directed down, gain is decreased from the minimum range gain towards 0 dB at the rate of 10 dB per 60,000 feet.

Gain/threshold changes described so far may not be an ideal match for the three layer atmospheric model. This is done on purpose knowing pilot preferences. Pilots generally run their radars at gain settings well above calibrated gain. The desire to find convective cores seems to be a foremost desire during cruise. At lower altitudes the higher gains become a problem as many stratiform precipitation situations display the same high level radar displays as convective cores do during cruise even though weather penetration is not a problem in the stratiform case. So the two guiding principals are; make the gain high at altitude and keep the system from over-warning at low altitude. Since there is a general tendency for weather to decrease in return level as altitude increases over the zero degree isotherm, a calibrated response below this altitude may be preferable. After modeling the wet and bright-band effects on returns from cruise altitudes, it can be seen that the radar's beams are always heavily diluted with low reflectivity freezing returns and thus the higher gain at altitude may be generally continued at all ranges. This continuing of upwardly adapted gain as range increases improves the matching of returns over different ranges. Decaying gain slightly as range increases allows the future matching of high beams and low beams at and past the radar horizon.

Even though only two regions are modeled, bright-band interaction with PAC may be inhibited by making the minimum PAC range a function of the absolute difference between the aircraft's local outside temperature and the freezing point. Remember the bright-band PAC interaction is highly sensitive to altitude and has its largest effects when radar sample is short and the radar sample is highly involve,d in the bright band. Delaying PAC by 5 miles in the example given before made over a 20 dB reduction in the estimated dBz level at 15 nautical miles. Even through this partial solution may leave a red radar display at minimum range, the red will not propagate throughout the entire display when is responding to stratiform rain.

FREEZING ALTITUDE ESTIMATION

The primary data driving the adaptive gain system is outside temperature, aircraft barometric altitude, individual sample ranges, and antenna beam altitude. The computation needed is the estimation of freezing altitude 185. This altitude is used to separate thresholds used at wet low altitudes from the increased gains used for altitudes above freezing.

$$DryLapseRate = \frac{2 \text{ deg.}}{1000 \text{ ft.}}$$

$$Alt_{Freeze} = Alt + \frac{TempC}{DryLapseRate}$$

As an example, consider an aircraft at 24 kft. with an external static air temperature of −16 degrees centigrade.

$$Alt_{freeze} = 1.6 \times 10^4 \text{ ft.}$$

The compensation of freezing altitude inside verses outside convection is a function of the local static air temperature. This implies the aircraft state, inside or outside convection, must be known before using local static air temperature to produce a freezing altitude estimate. Since aircraft either do not enter convection or when they do, stay in it for only a short period of time, a low pass filtered temperature estimate may be used to reduce the variation in freezing altitude estimates when flying in and out of convection. Since on average, lapse rate couples changes in temperature to changes in altitude, a complementary filter using high frequency data from altitude and low frequency data from temperature may be best to produce a local filtered static air temperature for use in estimating the freezing altitude. This filter should be initialized at the initial static air temperature. Filter response time constant for changes in temperature not accompanied by altitude changes should be in the 10 to 30 second range.

So, for example, $$Temp_{filtered} = 0.9 Temp_{filtered} + K TempC + 0.9 \delta T_{Lapseinduced}$$

where K is a filter constant (e.g. $4.2 \times 10^{-4}$ based on a 120 Hz sample rate), and $\delta T_{Lapseinduced} = (Altitude_{New} - Altitude_{Old}) \times 0.002$, e.g.

ADAPTIVE GAIN MECHANIZATION AND RESULTS LOOKING DOWN

An exemplary adaptive gain algorithm may be written as follows:

$$Alt_{AboveOC} = Alt - Alt_{OC} - 1000$$

If $\phi > 0 \theta = \phi$ otherwise $$\theta = \phi \times 0.25$$

$$SampleHeight = \theta \times R \times \frac{6076}{57.3} + Alt_{AboveOC}$$

If SampleHeight<0 SampleHeight=0 otherwise $$Gain = SampleHeight \times \frac{10}{15000}$$

If Gain>10, Gain=10 where Range (R) is in nautical miles, aircraft altitude (Alt) is in feet, zero degree centigrade altitude ($Alt_{OC}$) is in feet, $\phi$ is in degrees. The algorithm returns a gain value dB.

BEAM MERGING CONSTRAINTS TO ADAPTIVE GAIN DURING LOOK DOWN

As the aircraft moves and target's range decreases, the target's radar returns will be taken from the upper beam until a distance when clutter no longer contaminates the radar sample in the lower beam. At this range, lower beam data may be used as well. Targets transitioning from the upper beam sampling to the sampling of the maximum of upper and lower beams may show a discontinuity. Limiting the range at which lower beam samples are taken will minimize this discontinuity.

In addition to the potential sampling of the bright band allowed by long range low beam sampling before the clutter range is reached, the altitude of samples taken at long low beam ranges may differ substantially from the aircraft's altitude and thus be outside of the pilot's area of interest.

Accordingly, the following equation may be applied to find the Range required for the lower beam ($R_{Low}$):

$$R_{Low} = \frac{\delta AltDesired}{6076 \times \sin\left(\frac{\phi_{LowerEdgeOfLowerBeam}}{57.3}\right)}$$

where $\delta$ AltDesired is the desired altitude change and $\phi_{LowerEdgeOfLowerBeam}$ is the angle to the lower edge of the lower beam. Because $\phi_{LowerEdgeOfLowerBeam}$ may approach zero, it may be desirable to limit $\phi_{LoweredgeofLowerBeans}$ to a predetermined value, such as but not limited to −2 degrees.

For "look down" the gain for the lower beam should be reduced by the value LowerBeamAdjust, where $$LowBeamAdjust = Range \times \sin\left(\frac{2.125}{57.3}\right) \times 1 \times 6076 \times \frac{10}{15000}$$

where Range is in nautical miles.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The system and method depicted and described are not limited to the precise details and conditions disclosed. Furthermore, other substitutions, modifications, changes and omisssions may be made in the design, operating conditions, and arrangement of the exemplary embodiments without departing from the scope of the invention as expressed in the appended claims.

What is claimed is:

1. A method for adapting weather radar gain, comprising:
   estimating a freezing altitude;
   determining, based on the freezing altitude estimate, an altitude of more than one atmospheric layer;
   determining a proportion of a radar beam sample in each atmospheric layer; and
   adjusting the radar gain, based on the proportion.
2. The method of claim 1, further comprising:
   measuring a radar's geographic location; and
   adjusting the radar gain based on the geographic locations.
3. The method of claim 1, further comprising:
   determining a time of year; and
   adjusting the radar gain based on the time of year.
4. The method of claim 1, further comprising:
   determining a time of day; and
   adjusting the radar gain based on the time of day.
5. The method of claim 1, further comprising:
   determining a portion of a radar beam sample above the freezing altitude.
6. An airborne weather radar system, comprising:
   a radar antenna on board an aircraft;
   an adjustable gain circuit for an electromagnetic signal sent via the radar antenna, the adjustable gain circuit coupled to the radar antenna; and
   a computational circuit configured to estimates a freezing altitude, the computational circuit coupled to the radar antenna and the adjustable gain circuit;
   wherein the adjustable gain is adjusted based on weather sample altitude and temperature.
7. The airborne weather system of claim 6, wherein the adjustable gain Is adjusted based on geographical location of the aircraft.
8. The airborne radar system of claim 6, wherein the adjustable gain is adjusted based on time of year.
9. The airborne radar system of claim 6, wherein the adjustable gain is adjusted based on a time of day.
10. The airborne radar system of claim 6, wherein the computational circuit is configured to determine an altitude range of three different atmospheric layers.
11. The airborne radar system of claim 10, wherein the computational circuit is configured to compute portions of a radar sample that are in the atmospheric layers.
12. The airborne radar system of claim 6, wherein the freezing altitude is calculated from a model selected from adlabatic lapse rate and a saturated lapse rate.
13. A method of adapting radar gains for a weather radar, comprising:
    measuring a temperature;
    determining a freezing altitude;
    measuring an altitude; and
    computing a radar gain based on the temperature and altitude.
14. The method of claim 13, further comprising:
    measuring an aircraft's geographic location; and
    computing the radar gain based on the geographic location.
15. The method of claim 13, further comprising:
    determine a time of year; and
    computing the radar gain based on the time of year.
16. The method of claim 13, further comprising:
    determine a time of day; and
    computing the radar gain based on the time of day.
17. The method of claim 13, further comprising:
    determining a portion of a radar beam sample above the freezing altitude.
18. The method of claim 13, further comprising:
    whether the radar is in a lookup mode or a look down mode.

* * * * *